April 14, 1953     E. C. REDETZKE     2,634,665
SPRING-CONTROLLED SHOVEL MOUNT FOR CULTIVATORS
Filed Sept. 9, 1946     2 SHEETS—SHEET 1
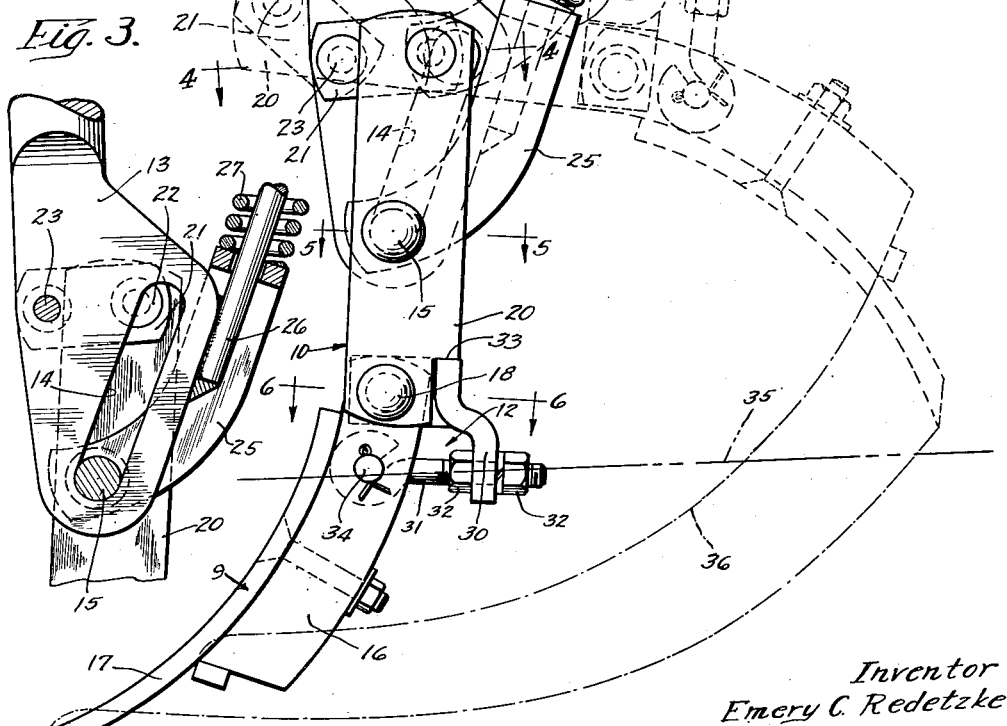
Inventor:
Emery C. Redetzke,
By Doane, Pond & Anderson
Attorneys.

April 14, 1953 E. C. REDETZKE 2,634,665
SPRING-CONTROLLED SHOVEL MOUNT FOR CULTIVATORS
Filed Sept. 9, 1946 2 SHEETS—SHEET 2
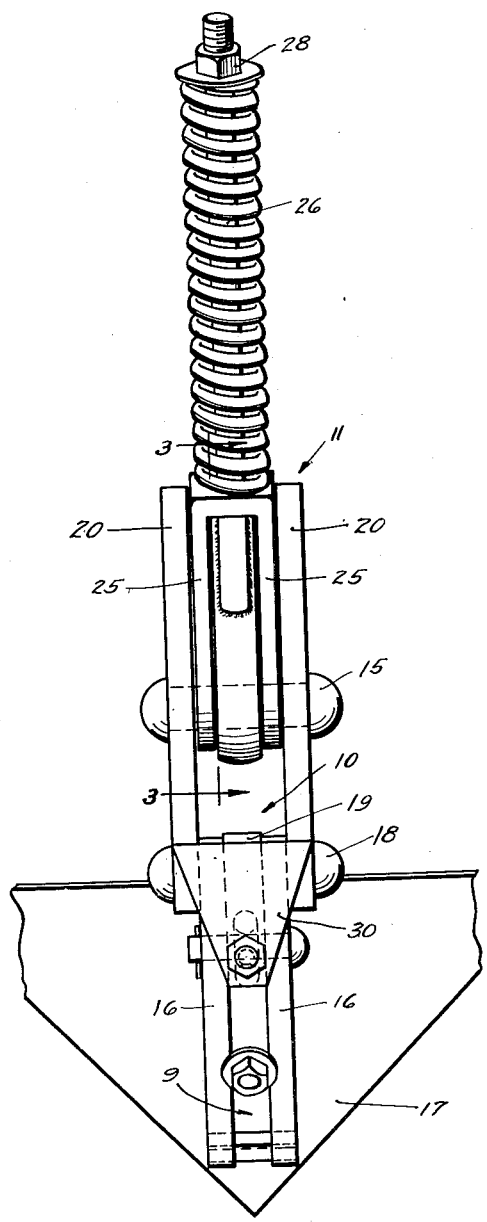
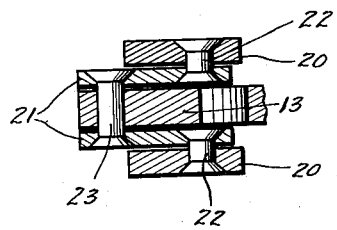
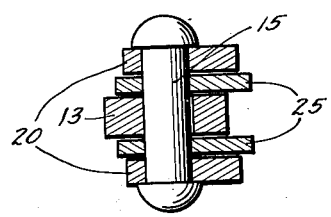
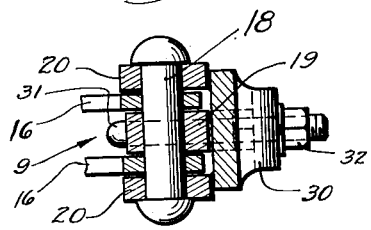
Inventor:
Emery C. Redetzke,
By Soans, Pond & Anderson
Attorneys Patented Apr. 14, 1953

2,634,665

UNITED STATES PATENT OFFICE 2,634,665

SPRING-CONTROLLED SHOVEL MOUNT FOR CULTIVATORS

Emery C. Redetzke, Rock Island, Ill., assignor to J. I. Case Company, Racine, Wis., a corporation of Wisconsin Application September 9, 1946, Serial No. 695,764

9 Claims. (Cl. 97—184)

1

This invention relates to a spring-controlled shovel mount for cultivators.

In the cultivation of soil it frequently happens that obstructions are encountered by the shovels or steels. Injury of a shovel or steel is likely to result unless it is retracted as the cultivator continues its forward movement.

The main objects of this invention, therefore, are to provide an improved spring-controlled mounting for cultivator shovels which permits the retraction of a shovel upon its engagement with an obstruction likely otherwise to cause injury to the shovel; to provide an improved mounting of this kind which promptly returns the shovel to its operating position once the obstruction has been passed; to provide an improved construction of this kind which permits the principal parts to be made of welded stampings; and to provide an improved shovel mounting of this kind which is very simple in construction, which can be attached to any cultivator frame, and which is positive in operation.

A preferred embodiment of this invention is shown in the accompanying drawings in which:

Fig. 1 is a side elevation of this improved spring-controlled shovel-mount, showing in full line the shovel in its normal operative position below the ground level, and in dotted outline the position to which it is retractable by an obstruction extending to the ground level;

Fig. 2 is a rear elevation of this improved spring-controlled shovel-mount in its normal, operative position;

Fig. 3 is a fragmentary detail taken on the line 3—3 of Fig. 2;

Fig. 4 is a transverse sectional detail taken on the line 4—4 of Fig. 1;

Fig. 5 is a similar view taken on the line 5—5 of Fig. 1; and

Fig. 6 is a similar view taken on the line 6—6 of Fig. 1.

The embodiment of the invention illustrated in the drawings comprises a supporting post or staff 8, a cultivator shovel 9, and means 10 for supporting the shovel on the staff 8. The shovel is yieldingly held in its normal operating position by means of a stabilizer or trip mechanism 11, and the shovel is retractable from this position if and when it strikes an obstruction that might cause injury thereto, or to the cultivator. The angularity of the shovel 9 relative to the staff 8 and the shovel-supporting means 10 is determined by an adjustment means 12.

The supporting post or staff 8 is of cylindrical form and is adapted to be attached to a culti-

2 vator frame. The lower end of the post is flattened to provide a shank 13 and a slot 14 is provided in the shank. The slot 14, as will be apparent from Figs. 1 and 3, is disposed at a slight angle to the axis of the supporting post 8 and is adapted to receive a pin 15 which constitutes a part of the shovel supporting means 10.

The shovel 9 comprises a pair of generally parallel, forwardly curving bars 16 connected together at their lower ends and carrying a suitable tool 17, the bars 16 being pivoted at their upper ends to the shovel-supporting means 10 by means of a pin 18. A spacer 19 holds the upper ends of the bars 16 in spaced apart, parallel relationship.

The shovel-supporting means 10 includes a pair of elongated, spaced apart, generally parallel, shovel supporting link members or plates 20 which are connected together intermediate the ends thereof by the pin 15 which engages the slot 14 in the shank 13. The lower ends of the shovel supporting link members 20 are connected to the shovel 9 by means permitting relative adjustment of the shovel, as will hereinafter be described. The upper ends of the shovel supporting link members are connected to the shank 13 by a pair of short, generally parallel links 21. The links 20 and 21 and the pin connection 15 co-act to permit the shovel 9 to swing rearwardly and upwardly upon its striking an obstruction.

One end of each of the links 21 is pivoted to the upper end of one of the shovel supporting members 20 by means of a pivot pin 22 and the other end of each of the links 21 is pivoted to the flattened shank 13 of the staff 8 by a pivot pin 23. The pins 22 are connected to the upper ends of the shovel supporting members 20 adjacent the rear edge thereof, whereas the pin 23 is connected to the shank 13 adjacent the forward edge thereof. The spacing and relative positioning of the pivot pins 22 and 23 and the pin 15 ensure the freedom of movement of the pin 15 in the slot 14 and are of importance in accomplishing the invention.

The initial thrust of the shovel 9, resulting from contact with an obstruction, is horizontal and is usually approximately perpendicular or normal to the axis of the post 8. The immediate result is a tendency for the shovel 9 and supporting plates 20 to revolve about the axis of the pin 15. The upper ends of the shovel supporting plates 20 tend to swing forwardly and produce a horizontal thrust against the pivot pins 22 and 23 of the links 21 more or less perpendicular to the axis of the post 8.

It is desired that this initial thrust of an obstruction against the shovel 9 shall effect instantly a vertical movement of the shovel 9 and the shovel supporting members 20, so that the shovel 9 may swing upwardly to pass over the obstruction. Such a vertical movement requires that the links 21 be started on a movement about the axis of the pivot pin 23 as a result of the horizontal thrust transmitted through the shovel supporting members 20 as represented by the arc 24 (see Fig. 1). To make that movement possible the axis of the pivotal connection 22 between the shovel supporting members 20 and the linkage 21 connecting those members to the shank 13 is located to one side of a plane which contains the pin 15 and the pivotal connection 23 between the linkage 21 and the shank 13, when the pin 15 is in the bottom of the slot 14. This arrangement will avoid the possibility of the links 21 locking as might be the case if the axis of the pivot pins 22 were located in the plane of the pivots 15 and 23. It will also be noted that the line of action of the links 21, i. e. the line connecting the axis of the pivots 22 and 23 intersects the line of action of the link members 20, i. e. a line connecting the axis of the pin 15 and the axis of the pivot 22, at an acute angle when the shovel support means is in its normal operating position. Further, this acute angle will decrease in magnitude as the shovel support means is moved rearwardly by the obstruction, with the end result that the shovel will tend, in effect, to jump upwardly and backwardly at a rapid rate in the event an obstruction is encountered. The acute angle relationship of the line of action of the links 21 and the line of action of the shovel supporting links 20 and the cooperative relationship of these links with the pin and slot connection between the post and the shovel supporting means assures positive and reliable operation of the device at all times.

The stabilizer or spring-trip means 11 includes a yoke 25 connected at its lower open ends to the shovel supporting members 20 by the pin 15. The yoke 25 is slidably mounted at its closed upper end on a rod 26 which is affixed at its lower end to the shank portion 13 of the staff 8, and is adapted to be biased downwardly by a spring 27, interposed between the yoke 25 and a nut 28 adjustably supported on the rod 26. The base 29 of the yoke 25 embraces the rod 26 above the latter's connection to the shank 13. The rod 26 is preferably welded to the shank 13 so as to extend upwardly and rearwardly with the axis of the rod parallel to the longitudinal dimension of the slot 14. As will be apparent from Fig. 1, the pressure exerted by the compression spring 27 on the yoke 25 may be adjusted by suitable movement of the nut 28.

The adjustment means 12, for determining the angularity of the shovel 9 with regard to the shovel supporting means 10, comprises a web 30 and a rod 31 adjustably connected together by nuts 32. The web 30 is welded to the shovel supporting members 20, and its upper end is adapted preferably, but not necessarily, to abut against shoulders 33 provided on the shovel supporting-plates 20 adjacent the pin 18. The inner end of the rod 31 is curved so as to pivotally engage a pin 34 which extends between the bars 16.

During normal operation of the device the stabilizing means 11 will hold the shovel 9 in the soil below the surface, represented by the line 35 in Fig. 1. If the shovel 9 strikes an obstruction as it moves through the soil, forward movement of the shovel will stop, and continuing movement of the cultivator forward will cause the shovel 9 to swing upwardly and rearwardly, as the cultivator continues to move forward, so as to clear the obstruction. This, in effect, produces relative movement between the shovel 9 and supporting post 8 from the operative position shown in full lines in Fig. 1 to a retracted position shown in dotted lines in the same figure. The amount of relative movement or effective rearward and upward swing of the shovel 9 will of course depend upon how near to the surface of the ground the obstruction protrudes and upon the size of the obstruction.

Once the obstruction has been cleared the spring 27 will exert a strong force tending to restore the shovel 9 automatically to its normal operative position, and under favorable soil conditions, automatic resetting of the shovels will be effected without any further action by the operator. Under unfavorable conditions, the operator may find it necessary to raise the cultivator rigs, but this is the only operation needed to reset the shovels following operation of the shovel mount. This is a very important feature of the invention, because in the prior structures it is usually necessary to back the tractor with the cultivator rigs in the ground in order to reset the supports. Such a procedure is time consuming and not nearly so satisfactory as the substantially automatic resetting made possible by the shovel support of the present invention.

Variations and modifications in the details of structure and arrangement of the parts may be resorted to within the spirit and coverage of the appended claims.

I claim:

1. In a device of the class described, the combination of a supporting post having a slot provided therein, said slot being inclined slightly from the axis of said post, a shovel supporting means, a pin secured to said shovel supporting means intermediate its length, said pin being slidably retained in said slot, a linkage pivotally connected at one end to one end of said shovel supporting means and at the other end to said post forwardly of said slot, said linkage swingably connecting said shovel supporting means to said post and the axis of the pivot which connects said linkage to said shovel supporting means being located to one side of a plane which contains the axis of said pin and the axis of the pivot connecting said linkage to said post when said pin is in the bottom of said slot, said linkage co-acting with the pin and slot connection between said shovel supporting means and said post to permit a rearwardly upward swinging of said shovel supporting means relative to said post, and resilient means yieldingly resisting movement of said shovel supporting means relative to said post.

2. In a device of the class described, the combination of a supporting post having a slot provided therein, a shovel supporting means, a pin secured to said shovel supporting means and slidably retained in said slot, a linkage swingably connecting said shovel supporting means to said post and co-acting with said pin and slot connection between said shovel supporting means and said post to permit a rearwardly upward swinging of said shovel supporting means relative to said post, a rod fixed to said post and extending upwardly rearwardly therefrom, adjustment means on the upper end of said rod, other means pivoted at its lower end to said shovel supporting means and having a part thereof slidably embracing said rod, and a spring interposed between said part and said adjustment means for yieldingly resisting relative movement of said shovel supporting means and said post.

3. In a device of the class described, the combination of a supporting post having a slot provided therein, a shovel supporting means, a pin secured to said shovel supporting means and slidably retained in said slot, a linkage swingably connecting said shovel supporting means to said post and co-acting with said pin and slot connection between said shovel supporting means and said post to permit a rearwardly upward swinging of said shovel supporting means relative to said post, a rod fixed to said post and extending upwardly rearwardly therefrom with its axis parallel to the longitudinal dimension of said slot, adjustment means on the upper end of said rod, other means pivoted at its lower end to said shovel supporting means and having a part thereof slidably embracing said rod, and a spring interposed between said part and said adjustment means for yieldingly resisting relative movement of said shovel supporting means and said post.

4. In a device of the class described, the combination of a supporting post having a flattened shank at its lower end wherein there is provided a slot disposed slightly at an incline to the axis of said post, a pair of shovel supporting members, a pin connecting said shovel supporting members and slidably retained in said slot, a pair of links pivotally connected at one end to the upper ends of said shovel supporting members and at the other end to said shank, said links being adapted to co-act with said pin and slot connection between said shovel supporting members and said post to permit said plates to swing rearwardly upward on said post, a rod fixed to said shank and extending upwardly rearwardly thereof with its axis parallel to the longitudinal dimension of said slot, adjustment means on the upper end of said rod, a yoke pivoted at its open lower ends to the pin connecting said shovel supporting members and having the closed end thereof in slidable engagement with said rod, and a spring embracing said rod and interposed between said adjustment means and the closed end of said yoke for yieldingly resisting the rearward upward swing of said shovel supporting members.

5. In a device of the class described, the combination of a supporting post having a flattened shank at its lower end wherein is formed a slot slightly at an incline to the axis of said post, a pair of shovel supporting plates in the form of metal stampings, a depending shovel in the form of a pair of metal stampings having a shoe welded to their lower ends and connected at their upper ends to said plates, a pin connecting said plates and slidably retained in said slot, a pair of links pivotally connected at their opposite ends to the upper ends of said pair of plates and said shank respectively and adapted to co-act with said pin and slot connection to permit said plates to swing rearwardly upward on said post, a rod fixed to said shank and extending upwardly rearward thereof with the axis parallel to the longitudinal dimension of said slot, adjustment means on the upper end of said rod, a yoke in the form of a metal stamping pivoted at its lower ends to said shovel-plates pin and having a part thereof slidably embracing said rod, and a spring embracing said rod and interposed between said adjustment means and said yoke for yieldingly resisting the upward swing of said plates.

6. In a device of the class described, the combination of a supporting post having a slot provided therein, a shovel supporting means which includes a link member, a pin which is secured to said shovel-supporting link member intermediate the ends thereof and which is slidably retained in said slot, a second link member pivotally connected at one end to said post, and pivotally connected at the other end to said shovel-supporting link member at a point spaced from said pin, said shovel supporting link member and said second link member co-acting with said pin and slot connection to permit a rearward and upward swinging of said shovel supporting means relative to said post, and resilient means connected between said post and said shovel supporting link member for biasing said pin and said shovel supporting means toward the normal operating position thereof, thereby to resist movement of said shovel supporting means relative to said post.

7. In a device of the class described, the combination of a supporting post having a slot provided therein, a shovel supporting means which includes a link member, a pin which is secured to said shovel-supporting link member intermediate the ends thereof and which is slidably retained in said slot, a second link member pivotally connected at one end to said post, and pivotally connected at the other end to said shovel-supporting link member at a point which is spaced from said pin and which is located to one side of a plane which contains the axis of said pin and the axis of the pivot connecting said second link member to said post when said pin is in the normal operating position thereof, said link members and said pin and said slot connection between said shovel-supporting means and said post co-acting to permit a rearward and upward swinging of said shovel-supporting means relative to said post, and resilient means connected between said post and said shovel supporting link member for biasing said pin and said shovel-supporting means toward the normal operating position thereof, thereby to resist rearward and upward movement of said shovel supporting means relative to said post.

8. In a device of the class described, the combination of a supporting post having a slot provided therein, a shovel supporting means which includes a link member, a pin which is secured to said shovel-supporting link member intermediate the ends thereof and which is slidably retained in said slot, a second link member pivotally connected at one end to said post, and pivotally connected at the other end to said shovel supporting link member at a point which is spaced from said pin, the line of action of said second link member being disposed at an acute angle with reference to a line connecting said pin and the axis of the pivotal connection between said link members when said pin is in the normal operating position thereof, said link members and said pin and slot connection between said shovel supporting means and said post co-acting to permit a rearward and upward swinging of said shovel supporting means relative to said post, and resilient means connected between said post and said shovel supporting link member for biasing said pin and said shovel supporting means toward the normal operating position thereof, thereby to resist rearward and upward movement of said shovel supporting means relative to said post.

9. In a device of the class described, the combination of a supporting post, a shovel-supporting means which includes a link member, a pin and slot connection between said supporting post and an intermediate portion of said shovel-supporting link member, a second link member pivotally connected at one end to said post and pivotally connected at the other end to said shovel-supporting link member at a point spaced from said pin and slot connection, said shovel-supporting link member and said second link member coacting with said pin and slot connection to permit a rearward and upward swinging of said shovel-supporting means relative to said post, and resilient means connected between said post and said shovel-supporting link member for biasing said pin and shovel supporting means toward the normal operating position thereof, thereby to resist movement of said shovel-supporting means relative to said post.

EMERY C. REDETZKE.

References Cited in the file of this patent

UNITED STATES PATENTS

| Number | Name | Date |
|---|---|---|
| 198,320 | Stoddard | Dec. 18, 1877 |
| 641,996 | Phillips | Jan. 23, 1900 |
| 848,115 | Merrill | Mar. 26, 1907 |
| 895,351 | Dromgold | Aug. 4, 1908 |
| 1,078,871 | Olson | Nov. 18, 1913 |
| 1,099,304 | Katterhenry | June 9, 1914 |

FOREIGN PATENTS

| Number | Country | Date |
|---|---|---|
| 292,129 | Germany | May 26, 1916 |